Sept. 1, 1953 W. J. NORTON 2,650,495
MEANS FOR MEASURING AND INDICATING THE TENSION IN STRIP
PASSING BETWEEN THE STANDS OF A ROLLING MILL
Filed Feb. 28, 1949 2 Sheets-Sheet 1

Inventor
W. J. Norton

Sept. 1, 1953   W. J. NORTON   2,650,495
MEANS FOR MEASURING AND INDICATING THE TENSION IN STRIP
PASSING BETWEEN THE STANDS OF A ROLLING MILL
Filed Feb. 28, 1949   2 Sheets-Sheet 2
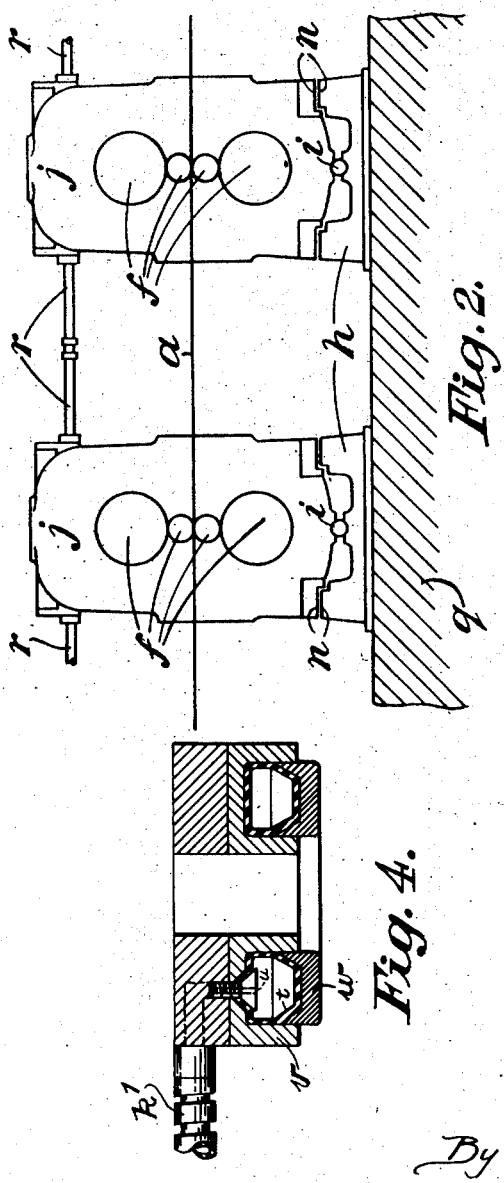
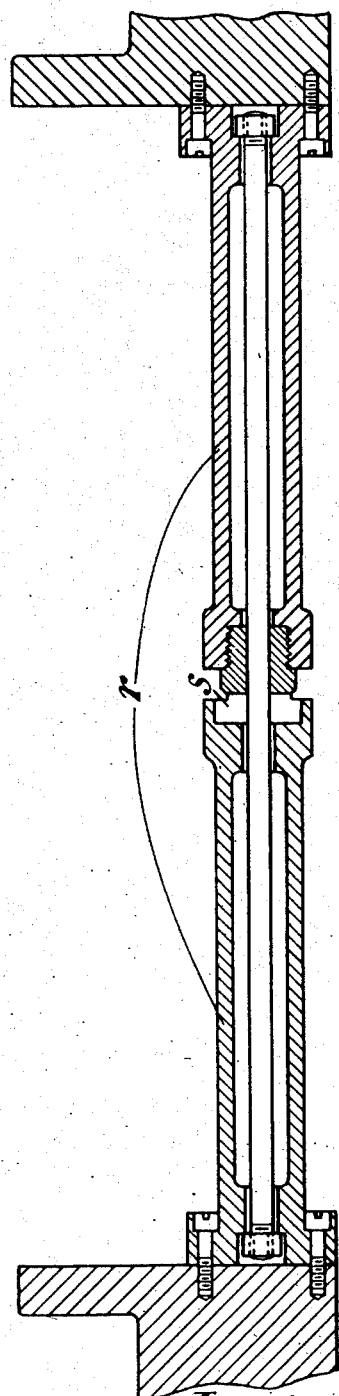
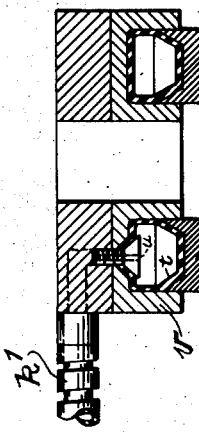
Inventor
W. J. Norton Patented Sept. 1, 1953

2,650,495

UNITED STATES PATENT OFFICE 2,650,495

MEANS FOR MEASURING AND INDICATING THE TENSION IN STRIP PASSING BETWEEN THE STANDS OF A ROLLING MILL

William John Norton, Salford, England, assignor to Sir James Farmer Norton & Company, Limited, Salford, England, a British company Application February 28, 1949, Serial No. 78,744
In Great Britain January 29, 1948

5 Claims. (Cl. 73—143)

1

This invention has for its object to provide improved means for measuring and indicating the tension in strip as it passes between stands in a continuous rolling mill, such means obviating the employment of deflecting rollers or the like between the stands and leaving the spaces between the roller stands clear from devices which have to be threaded with the strip. The improved means give direct readings of strip tension irrespective of the gauge of the strip and without any manipulation of the tension measuring apparatus.

The invention comprises the arrangement of one or more stands in a series to be capable of a limited amount of movement due to the pull of the strip, and the provision of means which are subjected to pressure due to such movement, the pressure being transmitted to indicators where required.

The invention further comprises the arrangement in which the stands which are capable of a limited amount of movement are each mounted on a fulcrum which may be a roller or shaft, with limiting stops at opposite sides of the fulcrum axis.

The invention further comprises the arrangement of struts or compression members projecting towards one another from adjacent stands with means between the struts or compression members in which a pressure is produced for transmission to an indicating instrument.

A pressure unit may be arranged between the moving part of a stand and the fixed bed thereof, such unit resisting movement of the stand about its fulcrum and indicating the tension in the strip passing through the mill.

Referring to the accompanying explanatory drawing,

Figure 2 is an elevation of part of a mill in another construction according to the invention.

Figure 3 is a sectional elevation of a pressure unit as used in Figure 2.

Figure 1:
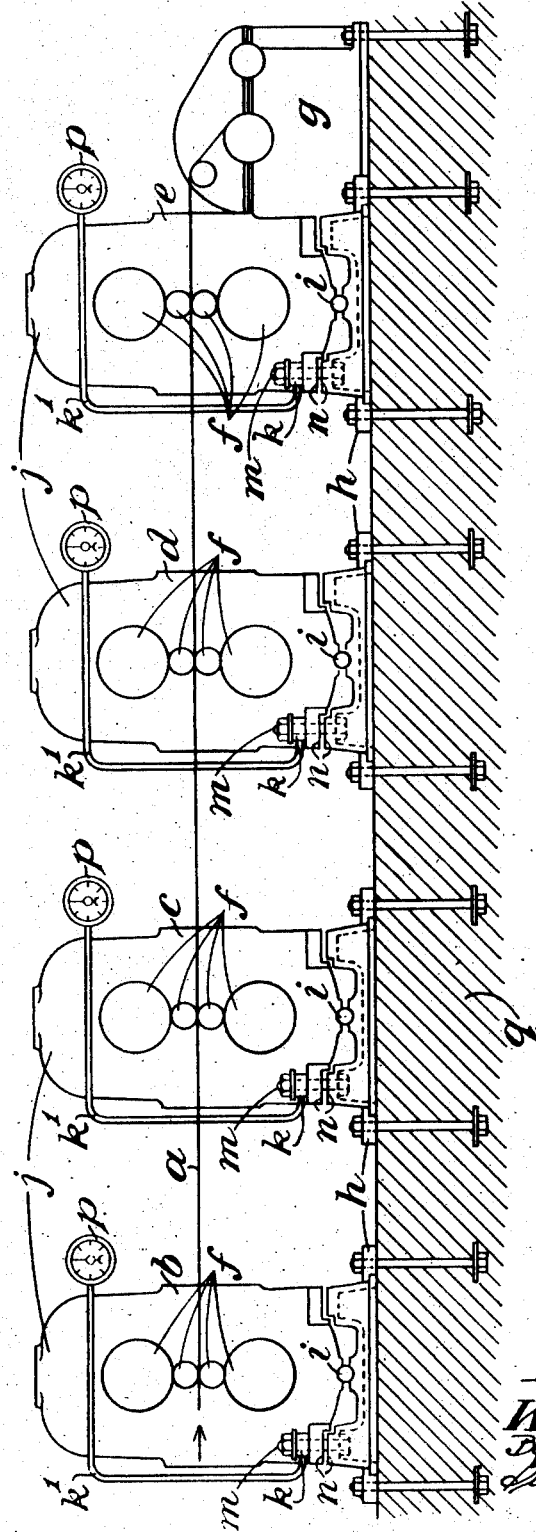
Figure 1 is a diagrammatic elevation of a four stand strip mill and coiler constructed in accordance with this invention.

Referring to Figure 1, strip $a$ passing through the four stands $b$, $c$, $d$ and $e$ is reduced in thickness by each set of rolls $f$ and the coiled in a coiler $g$.

Each stand comprises a bedplate $h$ bolted to a foundation $q$, a frame $j$ containing a set of rolls $f$, and a pressure unit $k$ held down by housing foot bolts $m$. The frame $j$ is pivotally mounted by means of a shaft $i$ on the bedplate $h$. The tension in the strip $a$ causes the frame $j$ to rock about the shaft $i$ and the pressure due to this movement is transmitted from the pressure unit

2

$k$ through a tube $k^1$ to a measuring instrument $p$ which is calibrated to indicate the strip tension.

To limit the movement of the frame $j$ in case of overload, stops are formed by abutment faces $n$ on each side of both bedplate $h$ and frame $j$, there being normally a gap of the order of one-hundredth of an inch between the faces.

This arrangement is adaptable to any number of stands in a continuous train, of which any one can be fixed, or all may be arranged to rock. Where all the stands are capable of rocking, as in the case illustrated, the coiling apparatus $g$ must be rigidly fixed, and the arrangement will then indicate also the tension between the last stand and the coiler. This system is applicable to a single stand and coiler.

Figures 2–3 illustrate an arrangement having compression members or struts $r$ arranged between the tops of adjacent stands $j$. Figure 2 shows only two stands, both arranged to rock, but any number may be used and any one of them may be rigidly fixed. The construction of the struts $r$ is shown in Figure 3, which is a longitudinal section through a pair of struts. The pressure in the pressure element $s$ is transmitted to a dial in any convient position.

Figure 4 shows in section the construction of the pressure units $s$ and $k$. An annular tube $t$ of rubber, filled with an incompressible liquid is sealed to a tube $u$ leading to a Bourdon type pressure gauge. The rubber tube $t$ is enclosed in an annular casing consisting of two metal members $v$ and $w$, one of which is a sliding fit with the other. Any pressure applied to the casing is immediately transmitted to the gauge.

What I claim is:

1. In a strip rolling mill of the type including a plurality of stands of rolls through which a strip successively passes, means for measuring and indicating the tension of the strip as it passes through the rolls comprising the combination of means mounting at least one of the stands for limited pivotal movement about a horizontal axis parallel to the axis of the rolls, said stand pivoting responsive to the pull of the strip while it is passing through the rolls, pressure developing means operable in response to the pivoting movement of the stand to determine the turning force of the stand as a function of the pull of the strip, and indicating means operable in response to the pressure developed to indicate the strip tension.

2. In a strip rolling mill of the type including a plurality of stands of rolls at least one of which is pivotally movable about a horizontal axis parallel to the axis of the rolls and through which rolls a strip successively passes, means for measuring and indicating the tension of the strip as it passes through the rolls comprising the combination of a fulcrum for the movable stand disposed parallel to the axis of the rolls, stops on opposite sides of the fulcrum axis to limit the pivotal movement of the stand, said stand pivoting responsive to the pull of the strip while it is passing through the rolls, pressure developing means operable in response to the pivoting movement of the stand to determine the turning force of the stand as a function of the pull of the strip, and indicating means operable in response to the pressure developed to indicate the strip tension.

3. In a strip rolling mill of the type including a plurality of stands of rolls at least one of which is pivotally movable about a horizontal axis parallel to the axis of the rolls and through which rolls a strip successively passes, means for measuring and indicating the tension of the strip as it passes through the rolls comprising the combination of a fulcrum for the movable stand disposed parallel to the axis of the rolls, stops on opposite sides of the fulcrum axis to limit the pivotal movement of the stand, said stand pivoting responsive to the pull of the strip while it is passing through the rolls, a fixed bed for each stand, pressure developing means arranged between each movable stand and its fixed bed and operable in response to the pivoting movement of the stand to determine the turning force of the stand as a function of the pull of the strip, and indicating means operable in response to the pressure developed to indicate the strip tension.

4. In a strip rolling mill of the type including a plurality of stands of rolls at least one of which is pivotally movable about a horizontal axis parallel to the axis of the rolls and through which rolls a strip successively passes, means for measuring and indicating the tension of the strip as it passes through the rolls comprising the combination of a fulcrum for the movable stand disposed parallel to the axis of the rolls, stops on opposite sides of the fulcrum axis to limit the pivotal movement of the stand, such stand pivoting responsive to the pull of the strip while it is passing through the rolls, compression members projecting toward one another from adjacent the top of each movable stand and the next adjacent stand, pressure developing means arranged between said compression members and operable in response to pivoting movement of the stand and thus relative movement of the compression members to determine the turning force of the stand as a function of the pull of the strip, and indicating means operable in response to the pressure developed to indicate the strip tension.

5. In a strip rolling mill of the type including a plurality of stands of rolls through which a strip successively passes, means for indicating the tension of a strip as it passes through rolls comprising the combination of coiling means and at least one stand of rolls through which the strip passes to the coiling means, said stand including a fixed bed and an upper portion housing the rolls, a fulcrum between the fixed bed and the upper portion disposed parallel to the axis of the rolls for mounting said upper portion for limited pivotal movement, said stand pivoting responsive to the pull of the strip while it is passing through the rolls, pressure developing means operable in response to said pivoting movement to determine the turning force of the stand as a function of the pull of the strip, and indicating means operable in response to the pressure developed to indicate the strip tension.

WILLIAM JOHN NORTON.

References Cited in the file of this patent
UNITED STATES PATENTS

| Number | Name | Date |
|---|---|---|
| 1,109,885 | Webster | Sept. 8, 1914 |
| 2,440,718 | Hornbostel | May 4, 1948 |